US012762691B2

(12) United States Patent
Wang et al.

(10) Patent No.: US 12,762,691 B2
(45) Date of Patent: Oct. 13, 2026

(54) HYBRID MB/ML TECHNIQUES FOR AUTOMATED PCB DEFECT DETECTION COMPRISING AN INSPECTION MODULE INCLUDING AN AUTOENCODER TRAINED TO RECOGNIZE AT LEAST ONE FEATURE OF INTEREST, AND A DEFECT DETECTION MODULE

(71) Applicant: BAE Systems Information and Electronic Systems Integration Inc., Nashua, NH (US)

(72) Inventors: Tao Wang, Belmont, MA (US); Helen Vo, South Lake Tahoe, CA (US); Helen F. Webb, Malden, MA (US); Victor T. Tom, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 473 days.

(21) Appl. No.: 18/337,827

(22) Filed: Jun. 20, 2023

(65) Prior Publication Data

US 2024/0428399 A1 Dec. 26, 2024

(51) Int. Cl.

*G06V 10/44* (2022.01)
*G06T 7/00* (2017.01)
*G06V 10/774* (2022.01)
*G06V 10/82* (2022.01)

(52) U.S. Cl.

CPC .............. *G06T 7/001* (2013.01); *G06V 10/44* (2022.01); *G06V 10/774* (2022.01); *G06V 10/82* (2022.01); *G06T 2207/20081* (2013.01); *G06T 2207/20084* (2013.01); *G06T 2207/30141* (2013.01)

(58) Field of Classification Search

CPC . G06T 2207/20081; G06T 2207/20084; G06T 7/0004; G06T 7/001; G06V 10/44; G06V 10/774; G06V 10/82

USPC .......................................... 382/141, 145, 147

See application file for complete search history.

(56) References Cited

U.S. PATENT DOCUMENTS

2020/0372339 A1* 11/2020 Che .......................... G06F 17/18
2021/0374928 A1* 12/2021 Hida ................... G06F 18/2433
2023/0125477 A1* 4/2023 Gurumurthy ............ G06N 3/08 382/103
2023/0136914 A1* 5/2023 Qiu .................... G01R 31/2837 324/755.02
2023/0186428 A1* 6/2023 Liu ........................ G06T 3/4038
2025/0272816 A1* 8/2025 Fiebag ................. G06V 10/809

* cited by examiner

*Primary Examiner* — Chad Dickerson
(74) *Attorney, Agent, or Firm* — Gary McFaline

(57) ABSTRACT

Hybrid MB/ML techniques for automated printed circuit board (PCB) defect detection. In one example, a PCB inspection system implements a hybrid solution using model based (MB) and machine learning (ML) technologies to detect possible defects in a PCB via an automated image capture device and processing methodology. The processing methodology fuses features from MB and ML at the latent representation. An autoencoder can be used to learn the fused data by training a neural network to produce a reconstructed image that can be compared to an original image to generate a reconstruction error value. The system produces an output indicating detection of a defect in one or more features of interest based on the reconstruction error value transgressing a threshold value.

20 Claims, 7 Drawing Sheets

HYBRID MB/ML TECHNIQUES FOR AUTOMATED PCB DEFECT DETECTION COMPRISING AN INSPECTION MODULE INCLUDING AN AUTOENCODER TRAINED TO RECOGNIZE AT LEAST ONE FEATURE OF INTEREST, AND A DEFECT DETECTION MODULE

BACKGROUND

Numerous defects can occur during manufacture of printed circuit boards (PCBs), such as incorrectly placed components, poor quality solder joints, and/or damaged or broken wire bonds or ribbon connectors. These defects can render the integrated circuits or other devices constructed with the PCBs inoperable or unsatisfactory for their intended purpose. Automatic optical inspection is used to attempt to detect defects during the manufacturing process so that the defects can be remedied before manufacture is complete. However, at present, only about 10% of all PCB defects can be found via automated optical inspection early enough in the assembly process to allow for appropriate remediation. In addition, some automated optical inspection processes produce high false positive defect detection rates and incorporate labor-intensive guided manual inspection following detection of a defect. Thus, a number of non-trivial issues remain with respect to automating PCB defect detection.

SUMMARY

Aspects and embodiments are directed to techniques for automating PCB inspection using hybrid model based (MB) and machine learning (ML) technologies.

According to one embodiment, a PCB inspection system comprises an imaging device configured to capture an image of a PCB under inspection, the PCB under inspection including at least one feature of interest, a data bus coupled to the imaging device and configured to receive the image, and a processing device coupled to the data bus. The processing device comprises an inspection module including an autoencoder trained to recognize the at least one feature of interest based on a combination of model data and training data, the autoencoder configured to receive and process the image to produce a reconstructed image, and a defect detection module configured to compare the reconstructed image to the image to generate a reconstruction error value, and to produce an output indicating detection of a defect in the feature of interest based on the reconstruction error value transgressing a threshold value.

According to another embodiment, a computer program product includes one or more non-transitory machine-readable mediums having instructions encoded thereon that when executed by at least one processor cause a process to be carried out for detecting defects in one or more features of interest on a printed circuit board (PCB). In some examples, the process comprises processing an image of the PCB using an autoencoder to generate a reconstructed image, the autoencoder having been trained to recognize the at least one feature of interest based on a combination of model data and training data, comparing the reconstructed image to the image, based on the comparison, generating a reconstruction error value representing a measure of difference between the image and the reconstructed image, and generating an output indicating detection of a defect in at least one of the one or more features of interest based on the reconstruction error value transgressing a threshold.

Another embodiment is directed to a method of detecting defects in one or more features of interest on a printed circuit board (PCB), the method comprising processing an image of the PCB using an autoencoder to generate a reconstructed image, the autoencoder having been trained to recognize the at least one feature of interest based on a combination of model data and training data, comparing the reconstructed image to the image, based on the comparison, generating a reconstruction error value representing a measure of difference between the image and the reconstructed image, and generating an output indicating detection of a defect in at least one of the one or more features of interest based on the reconstruction error value transgressing a threshold.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

DETAILED DESCRIPTION

Figure 1:
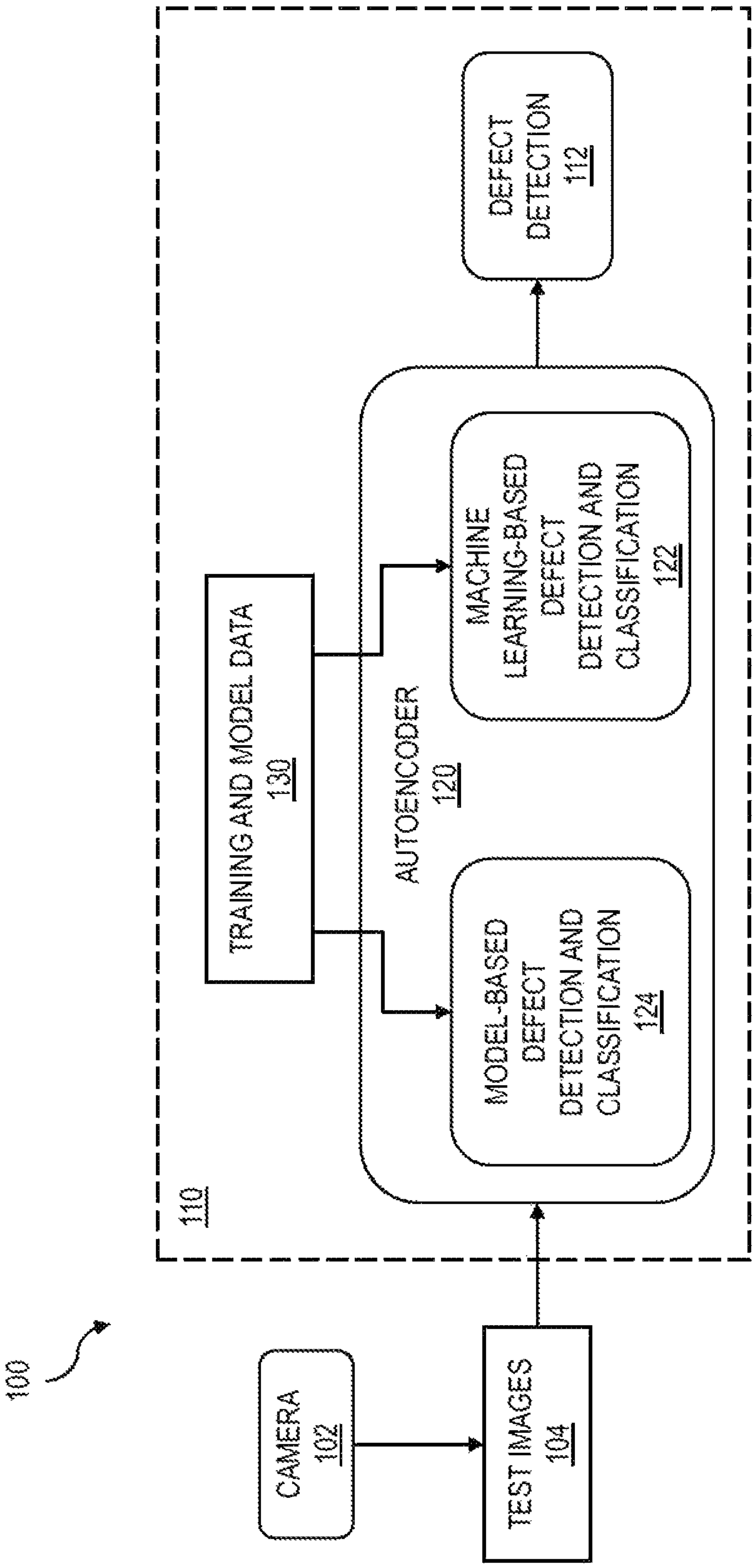
FIG. 1 is a block diagram of one example of an automated defect detection system including an autoencoder operating in inferencing mode, in accord with aspects of the disclosed technology.

Techniques are disclosed for automated printed circuit board (PCB) defect detection using a hybrid approach that combines machine learning with model-based defect detection using an autoencoder. According to certain examples, model-based features derived from processing model data representing one or more PCB features of interest are fused in the latent space representation of the autoencoder with machine-learning features derived processing training images of PCBs. This approach reduces the amount of training needed to train the autoencoder, while also allowing the autoencoder to quickly learn a robust defect-detection code by incorporating features from the model-based processing.

In one example, a printed circuit board (PCB) inspection system comprises an imaging device configured to capture an input or test image (or more simply, image) of a PCB under inspection, the PCB under inspection including at least one feature of interest, a data bus coupled to the imaging device and configured to receive the test image, and a processing device coupled to the data bus. The processing device comprises an inspection module including an autoencoder and a defect detection module. The autoencoder is trained to recognize the at least one feature of interest based on a combination of model data and training data. Once trained, the autoencoder is configured to receive and process the test image to produce a reconstructed image. The defect detection module is configured to compare the reconstructed image to the test image to generate a reconstruction error value, and to produce an output indicating detection of a defect in the feature of interest under inspection based on the reconstruction error value transgressing a threshold value.

General Overview

There is a need for efficient, accurate automated PCB defect detection. As noted above, inspection processes that use existing automatic optical inspection typically find only a small percentage (e.g., ~10%) of actual PCB defects, and produce high false positives that can add significant human "touch time" per PCB being inspected. Automated inspection has proved challenging because defects can vary greatly in size, shape, appearance, visibility, and orientation. This makes it difficult for automated systems and processes to reliably locate and identify defects, leading to the problems of relatively low success rate and relatively high false positives discussed above.

An autoencoder is a type of artificial neural network that is used to learn efficient encodings of unlabeled data (unsupervised learning). An autoencoder learns two functions, namely an encoding function that maps an input data set to a code, and a decoding function that reconstructs the input data set from the code. Autoencoders have wide application in image noise reduction, image reconstruction, and dimensionality reduction. Recently, autoencoders have been applied to anomaly detection in a range of fields including fraud detection, fault detection, and intrusion detection. A challenge in applying autoencoders is the need for appropriate training data. For example, as noted above, in the case of PCB defect detection, there can be very large variation in defects, which can make it difficult to appropriately train an autoencoder without a vast quantity of training data that provides numerous examples of all defects. However, such training data may not be readily available.

Accordingly, techniques are disclosed herein for providing an automated PCB defect detection system that applies both model-based and machine learning-based technologies to achieve a hybrid solution that is both robust and reduces the need for comprehensive training data. According to certain examples, an autoencoder is trained using some training data, including actual images of PCBs, in combination with data from a model-based defect detection module to determine "normal" (PCBs with no defects) and identify defects, without limiting PCB size or orientation or defect shape, appearance, or location. As described in more detail below, machine learning based on training data is fused with information from the model-based defect detection module in a latent representation in the autoencoder, thereby reducing the amount of training data required. Using this hybrid approach, a robust code is learned by the autoencoder even when only a small amount of training data with limited types of defects is available. This may be advantageous in circumstances where available training data is not sufficient to present the generality of any particular type of defect. In addition, this hybrid approach may also reduce the number of false positive detections and therefore advantageously reduce "touch time" associated with inspection.

System Architecture

FIG. 1 is a block diagram of an example of a system 100 for automated PCB defect detection in accordance with one embodiment. In this example, the system 100 includes an imaging device 102 and a defect detection system 110. The imaging device 102 may include any type of camera or imaging sensor that can acquire images of PCBs and provide the images to a computer-readable storage device (such as system storage 612 discussed below with reference to FIG. 6). In some examples, the imaging device 102 is a camera operating in the visual spectrum. In other examples, the imaging device 102 is a camera operating in another region of the electromagnetic spectrum, such as the infrared, ultraviolet, or x-ray bands, for example. In other examples, the imaging device may be a scanning electron microscope. In some examples, the imaging device 102 acquires images of the PCBs under inspection, or regions of the PCBs under inspection, as the PCBs pass the field of view of imaging device 102 on a movable platform, such as a conveyor. In certain examples, imaging of the PCBs performed by the imaging device 102 is automated. In other examples, an operator can control the imaging device to obtain images of PCBs. In any such cases, images 104 of PCBs that are acquired by the imaging device 102 can be processed by the defect detection system 110 to detect potential defects in the PCBs, as discussed further below.

The defect detection system 110 includes an autoencoder 120 that implements a hybrid defect detection approach using machine learning techniques for defect detection and classification (indicated at 122) in combination with model-based defect detection and classification (indicated at 124). The autoencoder 120 may operate in either a training mode or an inferencing mode. An untrained autoencoder 120 may be operated in the training mode, in which the model-based defect detection and classification process (referred to as the "model-based process") 124 and the machine learning-based defect detection and classification process (referred to as the "ML-based process") 122 are trained using training and model data 130, as described in more detail below. Once trained, the autoencoder 120 operates in the inferencing mode (also referred to as a detection mode) in which the autoencoder 120 processes the input images 104 captured via the imaging device 102 to produce an output that is evaluated for defects at a defect detection module 112.

Figure 2:
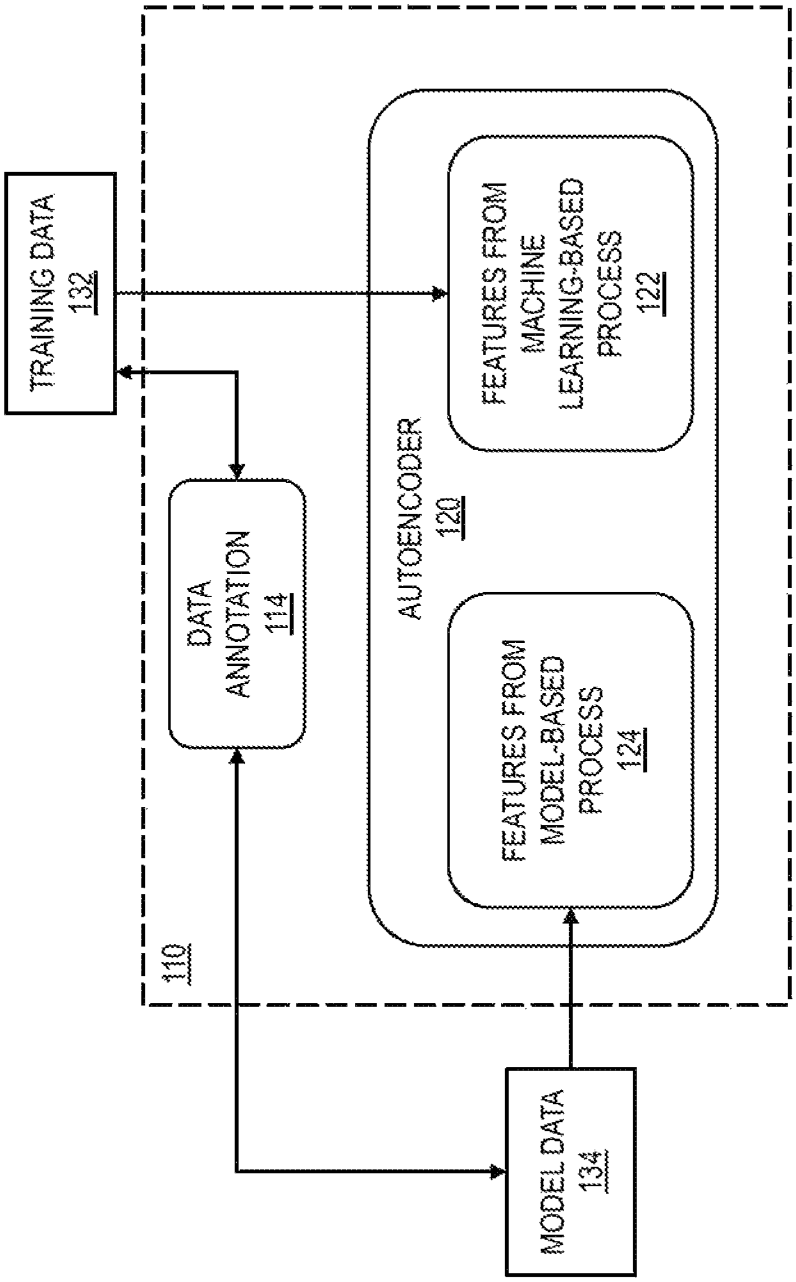
FIG. 2 is a block diagram of the automated defect detection system of FIG. 1 operating in training mode, in accord with aspects of the disclosed technology.

Referring to FIG. 2, there is illustrated a block diagram of an example of a portion of the defect detection system 110 with the autoencoder 120 in the training mode. In this example, the training and model data 130 (FIG. 1) includes training data 132 and model data 134. In the example shown in FIG. 1, the training and model data 130 is stored in one or more computer-readable storage media that are part of the defect detection system 110. However, the training data 132 and/or the model data 134 may be acquired from sources external to the defect detection system 110, and in some examples is stored external to the defect detection system 110 and accessed by the autoencoder 120.

Figure 3:
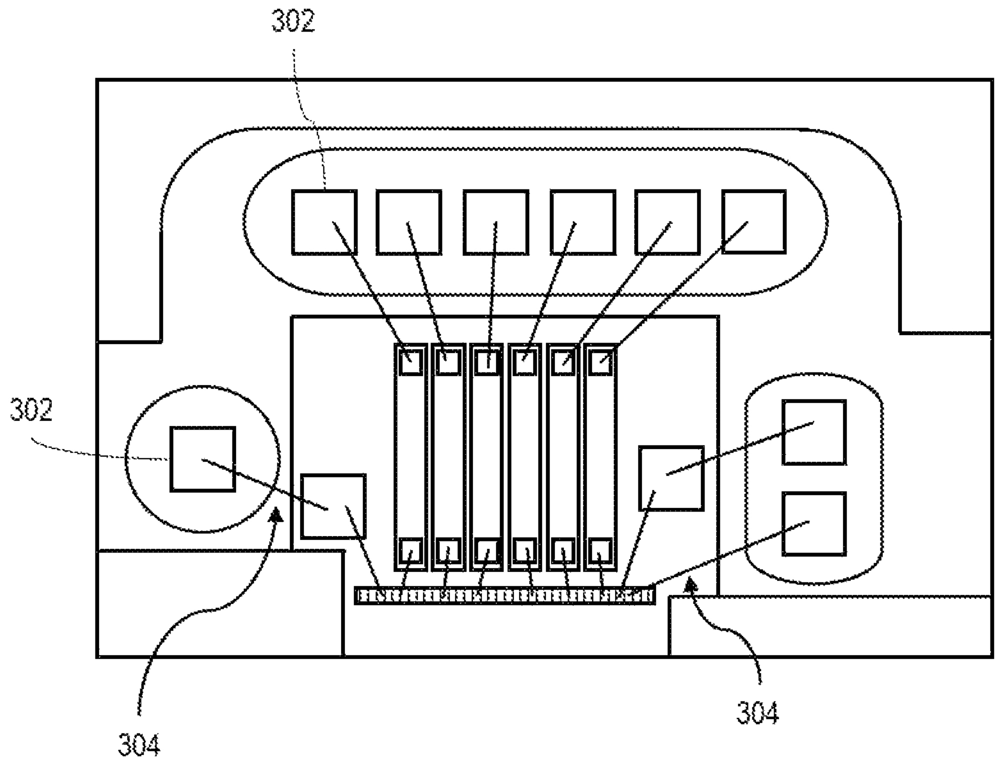
FIG. 3 is an example of a drawing that can be used as an item of model data, in accord with aspects of the disclosed technology.

According to certain examples, in the training mode of the autoencoder 120, two parallel processing chains are implemented via the autoencoder 120. A first processing chain uses the model-based process 124, which operates on the model data 134. The model data 134 may include various pictorial representations of PCB components and layouts, including, for example, drawings, sketches, models, and/or other characterizations or representations. In certain examples, the defect detection system 110 may be configured to detect one or more particular types of defects, such as bonding defects (e.g., wire bond and/or ribbon bond defects), for example. In such cases, the model data 134 may be tailored for detection and classification of these one or more certain types of defects. For example, the model data 143 may include visual representations of features associated with the one or more types of defects. These representations may illustrate the features from different viewing angles, at different locations on PCBs, in conjunction with various different types of other components, etc. For example, where the system is configured to detect bonding defects, the model data 134 may include images of numerous representations of wire bonds, bonding pads, bonding ribbons, and/or other bonding features. In certain examples, the representations depict these features without defects. FIG. 3 illustrates an example of a drawing, such as a computer-assisted drawing (CAD) image, showing a plurality of wire bond features, such as bonding pads 302 and wires 304, for example, as may be included in the model data 134. In some instances, the visual representations corresponding to the model data 134 are referred to herein as “images;” however, it will be appreciated that the model data 134 corresponds to drawings, or other synthetically created representations of PCB features, rather than photographic images of “real” PCBs or their components. Further, the model data 134 may be tailored depending on the type of imaging device 102 used. For example, model data 134 to be used in conjunction with images acquired from a camera operating in the visual/optical region of the electromagnetic spectrum may be different from model data to be used in conjunction with images acquired in a different spectral band or from a scanning electron microscope, for example.

Simultaneously with operation of the model-based process 124, a second processing chain uses the ML-based process 122 which operates on the training data 132. The training data 132 may include actual images of PCBs without defects. The training data images may be acquired using the imaging device 102 and/or acquired from other sources. In examples in which the defect detection system 110 is configured or tailored to detect one or more certain types of defects, the training data 132 includes images of PCBs without the certain one or more types of defects, even if the PCBs may have other defects.

In some examples, the defect detection system 110 includes a data annotation module 114 that is configured to annotate a portion of the training data 132 and/or the model data 134, for example, to identify certain regions, components, and/or features located in the training data 132 and/or the model data 134. Annotation information provided by the data annotation module 118 may be used by the autoencoder 120 during the training mode, as described further below.

Figure 4:
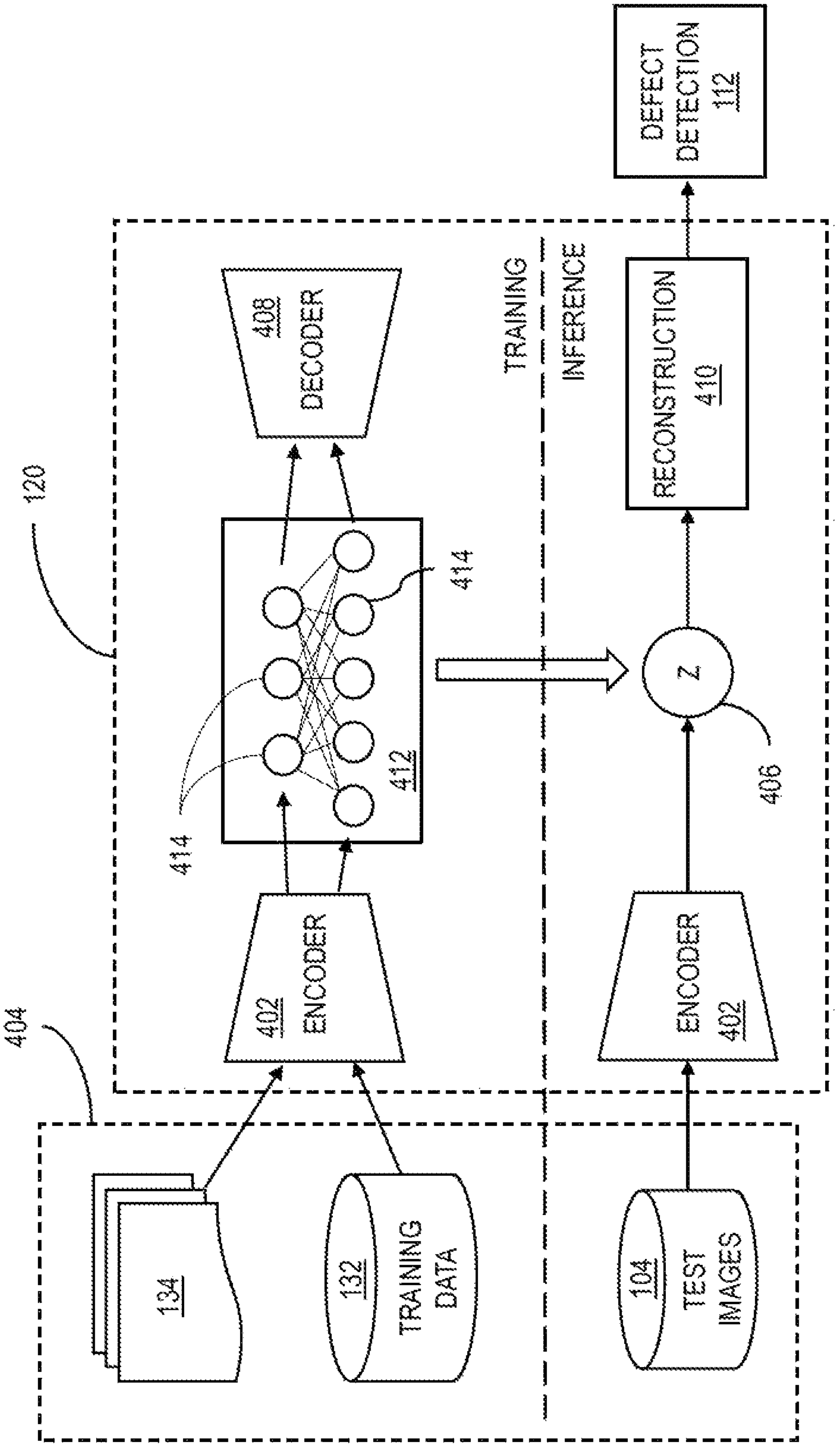
FIG. 4 is a block diagram of one example of an autoencoder of the system shown in FIGS. 1 and 2 and configured according to aspects of the disclosed technology.

Referring to FIG. 4, there is illustrated a block diagram of one example of the autoencoder 120 according to certain embodiments. It will be appreciated that the block diagram represents functional elements of the autoencoder 120, which may be implemented in software, firmware, hardware, or any combination thereof, as discussed further below with reference to FIG. 6.

The autoencoder 120 includes an encoder 402 that maps input data 404 to a code 406, and a decoder 408 that reconstructs the input data 404 from the code 406. An optimal autoencoder would perform as close to perfect construction of the input data 404 as possible, with performance of the autoencoder being evaluated according to a reconstruction quality function. The autoencoder 120 operates in the training mode, in which the encoder 402 learns an encoding function and the decoder 408 learns a decoding function, thereby constructing the code 406. Once trained, the autoencoder 120 operates in the inference mode in which the autoencoder 120 applies the code 406 to the test images 104. For each processed test image 104, the autoencoder 120 produces a reconstruction 410 of that test image based on the code 406. In the training mode, the input data 404 includes the training data 132 and the model data 134, and in the inference mode, the input data 404 includes the test images 104.

In the case of defect detection, the autoencoder 120 is trained to recognize one or more features (e.g., wire bonds, bonding pads, bond ribbons, etc.) present in the images in the input data 404, such that the code 406 precisely reproduces those features. When the input data 404 includes an anomaly or defect in one of the features the autoencoder 120 has been trained to recognize, the reconstruction performance of the code 406 worsens. The autoencoder 120 can be trained with input data 404 that includes only “normal” instances of the feature(s) of interest (no defects associated with those one or more features). After training, the autoencoder 120 accurately reconstructs “normal” (defect-free) test images 104, while failing to do so with unfamiliar test images 104 that include one or more defects. A reconstruction error (e.g., a measure of the difference between a respective test image and the reconstructed image 410) can then be used to detect defects.

According to certain examples, in the model-based processing chain, the images corresponding to the model data 134 are compressed or encoded, using the encoder 402, into a latent-space representation 412. Simultaneously, in the ML-based processing chain, the images corresponding to the training data 132 are compressed and encoded into the same latent-space representation 412 using the same encoder 402. As discussed above, the autoencoder 120 is a type of artificial neural network, and therefore, the latent space representation 412 includes a plurality of interconnected nodes 414. In the latent-space representation 412, shared representations of encoded model-based features (derived from the model data 134) and machine learning features (derived from the training data 132) are learned to discover the correlations between the features from each processing chain, and layers within the latent space representation 412 are created based on these correlations. Thus, the autoencoder 120 can be trained on combined features of interest that are derived from the combinations of correlated encoded model-based features and encoded machine learning features.

The model data 134 contains a set of images (samples) that show “good” (defect-free) examples of one or more features of interest. Using the encoder 402, the model-based process 124 encodes these samples, identifying features of interest and forming nodes 414 within the latent space representation 412 that correspond to the encoded model-based features. At the same time, the ML-based process 122 analyzes the training data 132 and, using the encoder 402, forms nodes 414 within the latent space representation 412 that correspond to the encoded machine learning features. During learning, the autoencoder 120 organizes one or more new layers within the latent space representation 412 between nodes 414 from the model-based process 124 and nodes 414 from the ML-based process 122. The autoencoder 120 may then learn to reconstruct one or more features of interest (build the code 406) based on the combined features derived from the model-based process 124 and the ML-based process 122. The autoencoder 120 learns pattern recognition corresponding to the one or more features of interest based on the nodes 414 and their interconnections.

In some examples, the encoded model-based features are unique (e.g., represented only in the model-based processing chain and not in the ML-based processing chain) because the images of those features in the model data 134 are unique. Further, it will be appreciated that individual images included in the model data 134 and/or the training data 132 may not contain all features of interest or may contain more than one feature of interest. For example, some images may show one type of feature, such as a wire bond, bonding pad, ribbon, etc., while others may show two or more types of features. However, some encoded machine-learning derived features will have similarities with encoded model-based features. Within the latent representation 412 of the autoencoder 120, nodes 414 associated with these common features can form connections describing the correlations between such features. Thus, the model-based process 124 and the ML-based process 122 can share and connect to the same unique encoded model-based features derived from the model data 134. As a result, the autoencoder 120 can construct a network within the latent space representation 412 where nodes 414 reference to the same type of encoded model-based and ML-based features.

The number of layers and their complexity (e.g., number of neurons) within the latent space representation 412 can vary depending on the application and environment. The more layers used (and the higher their complexity), the more accurate the reconstruction and the more robust the pattern recognition is due to the higher complexity of data patterns and greater number of data points in the data set. However, more layers and/or more complexity also requires a longer training time and higher computational power. Accordingly, there is a trade-off when designing the neural network structure of the latent space representation 412 to provide enough complexity to recognize patterns, and deviations from those patterns in the test images 104, but not so much complexity that the computational resources required to train and/or operate the autoencoder 120 become too expensive or impractical to include in a given situation.

In some examples, the model-based data 134 can be used by the model-based process 124 to identify regions of a PCB that correspond to one or more features of interest, such that the autoencoder 120 can focus learning on the identified regions of images in the training data 132. In examples in which the defect detection system 110 includes the data annotation module 114, annotations added to images in the model data 134 and/or training data 132 can be used to further guide or focus the learning of the autoencoder 120 to particular features of interest and/or regions of a PCB where those features are likely to be present.

In some examples, the model data 134 may be significantly more extensive than the training data 132. As discussed above, the training data 132 corresponds to images of actual PCBs, and therefore may be limited based on the PCBs available to photograph. In contrast, the model data 134 includes drawings, sketches, and/or other visual representations of various PCB features or components, and therefore can be as extensive, and as varied, as desired since there is no requirement to obtain a physical PCB to photograph. As discussed above, in many applications, including PCB defect detection, there can be significant variation in features that may be associated with a given type of defect. For example, in the case of wire bonds, the placement of the wire on the pad, shape of the wire, length of the wire, size, shape and/or orientation of nearby components, etc. can all vary significantly from one PCB to another, whether or not there is any defect in the imaged wire bond. In addition, the orientation of the PCBs when the images are taken by the imaging device 102 can also vary from one test sample to another. It can be difficult and/or expensive and time-consuming to acquire sufficient training data for the autoencoder 120 to learn a robust code 406 if the learning were performed using only the training data 132. By incorporating the model data 134, far less training data 132 is needed for the autoencoder 120 to learn to accurately reproduce the features of interest in the absence of defects.

In some examples, because the model data 134 may be more extensive than the training data 132, the model data may include examples of features of interest that are not present in the training data. As a result, in the latent representation 412 of the autoencoder 120, there may be more encoded model-based features than there are encoded machine learning features. According to certain examples, when encoded machine learning features are missing with respect to the corresponding model-based features, the combined features are allocated by using default values to replace the missing machine learning features. The autoencoder 120 can thus still be trained using the combined features to generate the code 406.

Once trained, the autoencoder 120 is operated in the inference mode to analyze the test images 104 acquired from the imaging device 102 to detect and identify defects in PCBs under inspection. The test images 104 are processed via the same encoder 402 and the code 406 that was constructed during the training mode. As discussed above, the autoencoder 120 produces a reconstruction 410 of a current test image 104. The reconstructed image 410 is processed by the defect detection module 112.

In some examples, the defect detection module 112 compares the current test image 104 with the corresponding reconstructed image 410. As discussed above, where the test image 104 contains no defects in the features of interest, assuming the autoencoder 120 has been well trained, the reconstructed image 410 will be a very accurate/close reconstruction of the original image. However, when there is a defect in one or more features of interest, the reconstruction quality worsens. Accordingly, the defect detection module 112 may produce a reconstruction error value based on the comparison between the current test image 104 and the corresponding reconstructed image 410. If the reconstruction error value is above or below a certain threshold value, the defect detection module may provide an output indicating that a defect has been detected. In some examples, the reconstruction error value may be a value within a certain range, for example, between 1 and 10 or between 1 and 100. In one example, a high reconstruction error value signifies a large error or large difference between the original test image and the corresponding reconstructed image. Thus, if the reconstruction error value is above a certain threshold value, for example, 70 or 80 on a 1-100 scale, the defect detection module 112 may indicate detection of a defect. However, in other examples, a high reconstruction error value may indicate high correlation between the original image and the reconstructed image (small/low error), and therefore, the defect detection module can be configured to indicate detection of a defect if the reconstruction error value is below a certain threshold, for example, 20 or 30 on a 1-100 scale. It will be appreciated that many variations in the scale and/or thresholds used for defect detection may be implemented and therefore the above-discussed examples are intended for illustration only.

Methodology

Figure 5A:
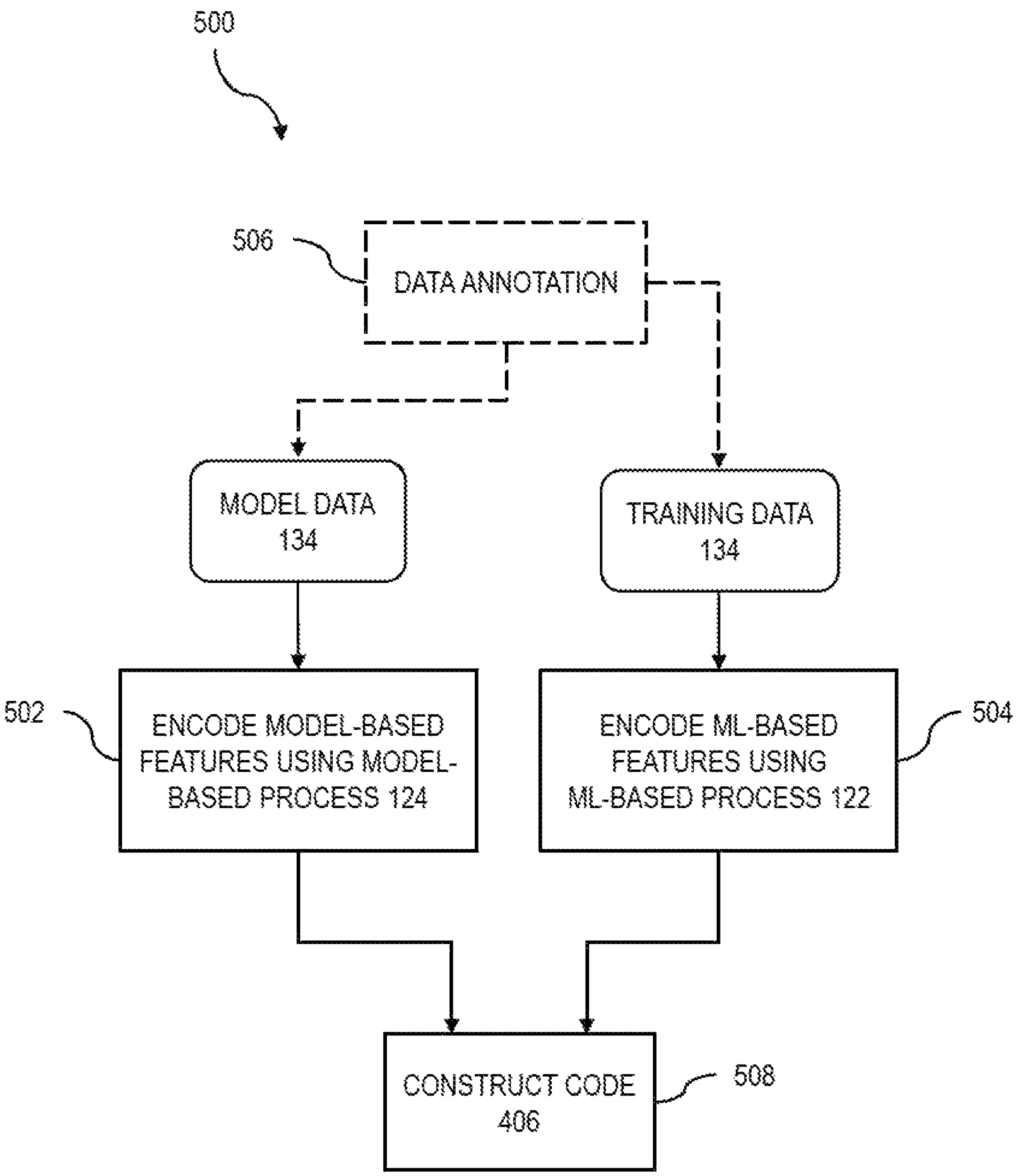
FIG. 5A is a flow diagram of one example of a method of training an autoencoder, in accord with aspects of the disclosed technology.

Referring to FIG. 5A, there is depicted a process flow diagram of a method 500 of training an autoencoder 120 according to certain aspects.

At 502, the model-based process 124 processes the model data 134 to encode model-based features to form model-based nodes 414 in the autoencoder latent space representation 412, as discussed above.

At 504, the ML-based process 122 processes the training data 132 to encode ML-based features to form ML-based nodes 414 in the autoencoder latent space representation 412, as also discussed above. 504 may be performed simultaneously with 502, and both 502 and 504 may be performed repeatedly over time with different images taken from the model data 134 and training data 132.

In some examples, the method optionally includes data annotation at 506. As discussed above, data annotation may be applied to the model data 134 and/or the training data 132 using the data annotation module 114.

At 508, the autoencoder 120 constructs the code 406 based on a network formed in the latent space representation 412 among nodes 414 representing encoded model-based features (derived at 502) and encoded ML-based features (derived at 504). It will be appreciated that 508 may be iteratively performed over time to build a robust final code 406 from learning over a large collection of model data 134 and the training data 132.

Figure 5B:
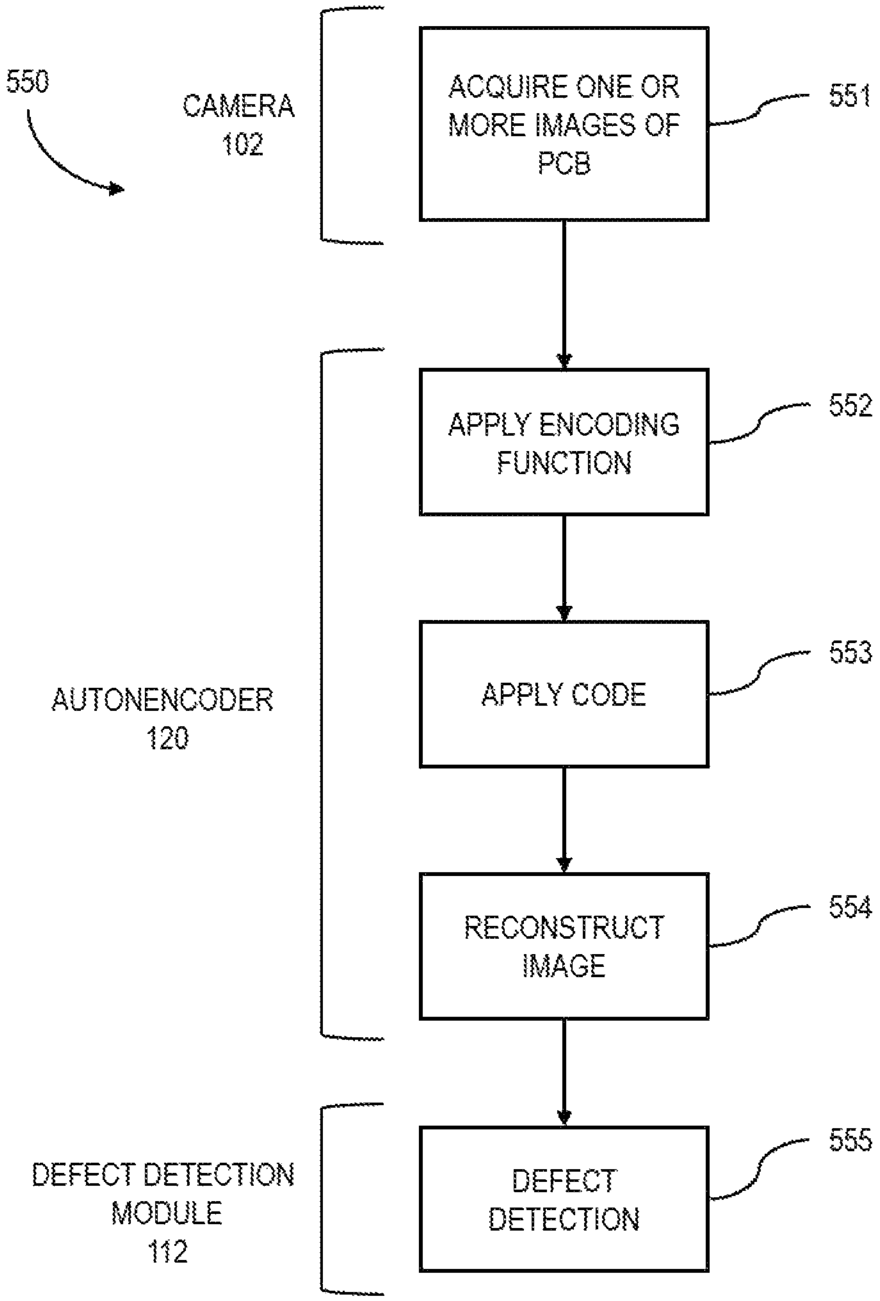
FIG. 5B is a flow diagram of one example of a method of defect detection using a trained autoencoder, in accord with aspects of the disclosed technology.

Referring to FIG. 5B, there is illustrated a process flow diagram of a method 550 of defect detection using the autoencoder 120 trained according to the techniques and processes disclosed herein.

At 551, one or more test images 104 of a PCB under inspection are obtained using the imaging device 102.

At 552, the one or more acquired test images 104 of the PCB under inspection are encoded using the encoder 402 of the autoencoder 120.

At 553, the autoencoder applies the code 406 generated during the training mode to the encoded image(s) produced at 552 to generate (at 554), for each original image, a corresponding reconstructed image based on the code 406. In some examples, at 554, the autoencoder is configured to score image features detected/recognized in the original image and reproduced in the reconstructed image.

At 555, the defect detection module 112 compares the original test image(s) 104 obtained at 551 with the corresponding reconstructed image(s) produced at 554 to determine a measure of accuracy of the reconstruction. As discussed above, in the absence of defects in the one or more learned features of interest, the reconstructed images will be relatively accurate representations of the original test images 104. In contrast, when a defect exists in a learned feature of interest, the reconstruction quality/accuracy decreases, that the defect detection module 112 may therefore determine that a defect is present and provide an output indicating that a defect has been detected. The PCB under inspection may then be further examined, either a human operator or further machine-based inspection tools, to confirm (or reject) a presence of the defect.

Example Computing Platform

Figure 6:
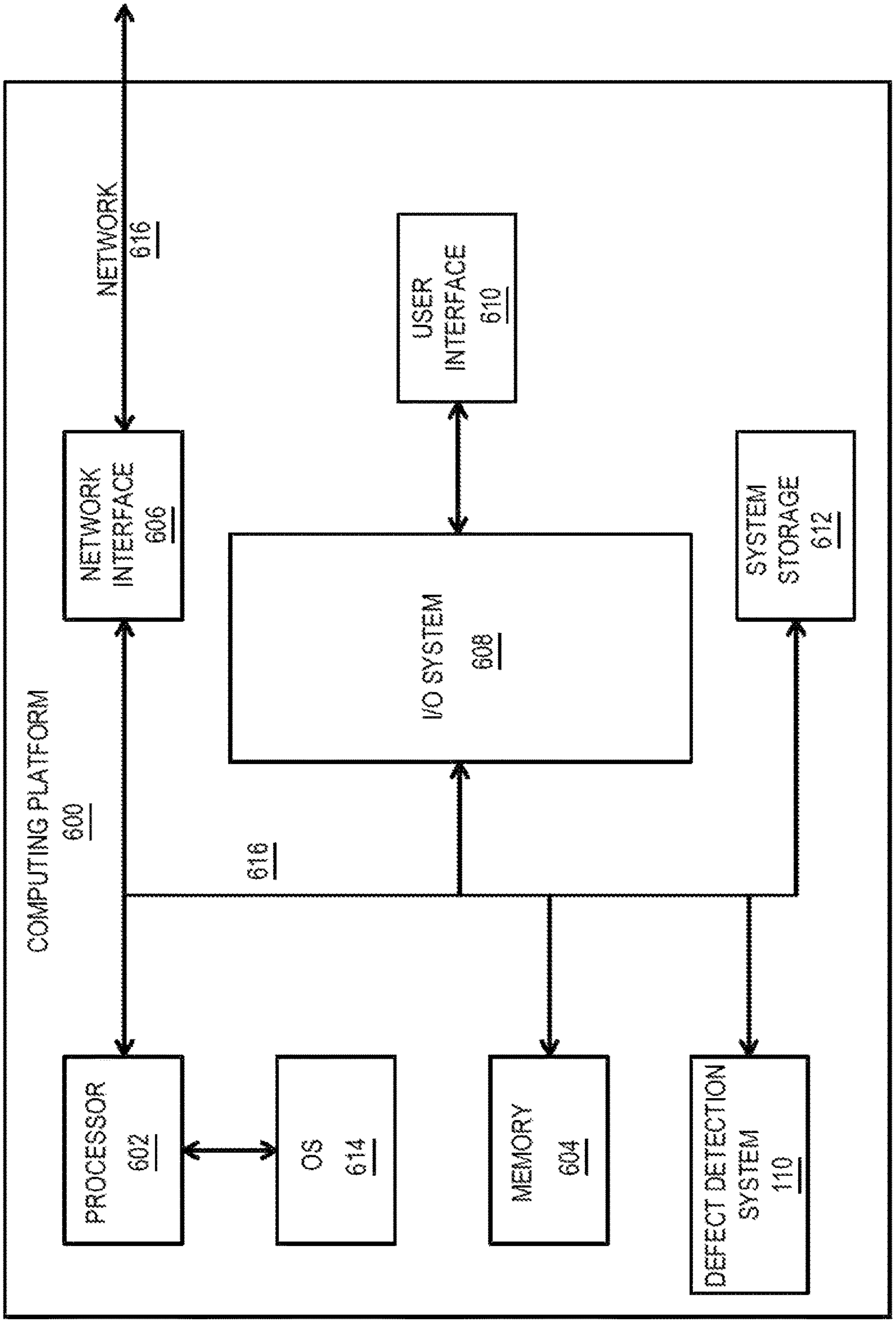
FIG. 6 is a block diagram of one example of a computing platform in accord with aspects of the disclosed technology.

FIG. 6 illustrates an example computing platform 600 that can be used to implement components and/or functionality of the defect detection system 110 described herein. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. In some embodiments, the computing platform 600 represents one system in a network of systems coupled together via controlled area network (CAN) bus or other network bus.

In some examples, the computing platform 600 may comprise any combination of a processor 602, a memory 604, an embodiment of the defect detection system 110, a network interface 606, an input/output (I/O) system 608, a user interface 610, and a storage system 612. In some embodiments, one or more components of the defect detection system 110 (e.g., the autoencoder 120 or aspects thereof) are implemented as part of the processor 602. As shown in FIG. 6, a bus and/or interconnect 616 is also provided to allow for communication between the various components listed above and/or other components not shown. The computing platform 600 can be coupled to a network 616 through the network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

The processor 602 can be any suitable processor and may include one or more coprocessors or controllers to assist in control and processing operations associated with the computing platform 600. In some embodiments, the processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

The memory 604 can be implemented using any suitable type of digital storage including, for example, flash memory and/or random access memory (RAM). In some embodiments, the memory 604 may include various layers of memory hierarchy and/or memory caches as are known to those of skill in the art. The memory 604 may be implemented as a volatile memory device such as, but not limited to, a RAM, dynamic RAM (DRAM), or static RAM (SRAM) device. The storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, the storage system 612 may comprise technology to increase the storage performance enhanced protection for valuable digital media when multiple hard drives are included. The storage system 612 and/or the memory 604 may store test images 104, the training data 132, and/or the model data 134.

The processor 602 may be configured to execute an Operating System (OS) 614 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with the computing platform 600, and therefore may also be implemented using any suitable existing or subsequently-developed platform.

The network interface 606 can be any appropriate network chip or chipset which allows for wired and/or wireless connection between other components of the computing platform 600 and/or the network 616, thereby enabling the computing platform 600 to communicate with other local and/or remote computing systems, servers, cloud-based servers, and/or other resources. In some examples, the network interface 606 may allow the computing platform to acquire the test images 104 from the imaging device 102 and/or to acquire the training data 132 and/or model data 134 from external sources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

The I/O system 608 may be configured to interface between various I/O devices and other components of the computing platform 600. I/O devices may include, but not be limited to, a user interface 610. The user interface 610 may include devices (not shown) such as a display element, touchpad, keyboard, mouse, and speaker, etc. The I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into the processor 602 or any chipset of the computing platform 600. In some examples, the I/O system 608 may be used to provide the defect detection output from the defect detection module 112 to a user.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, the computing platform 600 may be implemented as a wireless system, a wired system, or a combination of both. When implemented as a wireless system, the computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, the computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

ADDITIONAL EXAMPLES

Example 1 is a printed circuit board (PCB) inspection system comprising an imaging device configured to capture an image of a PCB under inspection, the PCB under inspection including at least one feature of interest, a data bus coupled to the imaging device and configured to receive the image; and a processing device coupled to the data bus. The processing device comprises an inspection module including an autoencoder trained to recognize the at least one feature of interest based on a combination of model data and training data, the autoencoder configured to receive and process the image to produce a reconstructed image, and a defect detection module configured to compare the reconstructed image to the image to generate a reconstruction error value, and to produce an output indicating detection of a defect in the feature of interest based on the reconstruction error value transgressing a threshold value.

Example 2 includes the PCB inspection of Example 1, wherein the autoencoder includes a model-based process configured to operate on the model data to generate a first plurality of neural network nodes corresponding to a plurality of model-based features derived from the model data, and a machine learning process configured to operate on the training data to generate a second plurality of neural network nodes corresponding to a plurality of machine learning-based features derived from the training data.

Example 3 includes the PCB inspection system of Example 2, wherein the autoencoder includes a neural network corresponding to interconnections between the first and second pluralities of neural network nodes, the neural network defining a code, and wherein the autoencoder is configured to encode the image to produce an encoded image, and to apply the code to the encoded image to produce the reconstructed image.

Example 4 includes the PCB inspection system of one of Examples 2 and 3, wherein the autoencoder includes a plurality of network layers, the first and second pluralities of neural network nodes being distributed among the plurality of layers.

Example 5 includes the PCB inspection system of any one of Examples 1-4, wherein the defect detection module is configured to produce the output indicating the detection of the defect based on the reconstruction error value exceeding the threshold value.

Example 6 includes the PCB inspection system of any one of Examples 1-5, wherein the at least one feature of interest includes a wire bond.

Example 7 includes the PCB inspection system of any one of Examples 1-6, further comprising at least one processor-readable storage medium coupled to the data bus and configured to store one or more of the training data, the model data, or the image.

Example 8 provides a computer program product including one or more non-transitory machine-readable mediums having instructions encoded thereon that when executed by at least one processor cause a process to be carried out for detecting defects in one or more features of interest on a printed circuit board (PCB). The process comprises processing an image of the PCB using an autoencoder to generate a reconstructed image, the autoencoder having been trained to recognize the at least one feature of interest based on a combination of model data and training data, comparing the reconstructed image to the image, based on the comparison, generating a reconstruction error value representing a measure of difference between the image and the reconstructed image, and generating an output indicating detection of a defect in at least one of the one or more features of interest based on the reconstruction error value transgressing a threshold.

Example 9 includes the computer program product of Example 8, wherein the process further comprises, prior to processing the image, training the autoencoder using the combination of the model data and the training data.

Example 10 includes the computer program product of Example 9, wherein training the autoencoder comprises processing the model data to generate a first plurality of neural network nodes corresponding to a plurality of model-based features derived from the model data, processing the training data to generate a second plurality of neural network nodes corresponding to a plurality of machine learning-based features derived from the training data, and creating a plurality of interconnections between the first and second pluralities of neural network nodes based on correlations between the model-based features and the machine learning-based features.

Example 11 includes the computer program product of Example 10, wherein training the autoencoder further comprises forming a plurality of layers in a latent space representation of the autoencoder, the first and second pluralities of neural network nodes being distributed among the plurality of layers.

Example 12 includes the computer program product of any one of Examples 9-11, wherein training the autoencoder comprises annotating at least a portion of at least one of the model data or the training data.

Example 13 includes the computer program product of any one of Examples 8-12, wherein the autoencoder comprises a code constructed based on correlations determined between model-based features derived from the model data and machine learning-based features derived from the training data, and wherein processing the image comprises encoding the image using the autoencoder to produce an encoded image, and applying the code to the encoded image to generate the reconstructed image.

Example 14 provides a method of detecting defects in one or more features of interest on a printed circuit board (PCB), the method comprising processing an image of the PCB using an autoencoder to generate a reconstructed image, the autoencoder having been trained to recognize the at least one feature of interest based on a combination of model data and training data, comparing the reconstructed image to the image, based on the comparison, generating a reconstruction error value representing a measure of difference between the image and the reconstructed image, and generating an output indicating detection of a defect in at least one of the one or more features of interest based on the reconstruction error value transgressing a threshold.

Example 15 includes the method of Example 14, wherein generating the output indicating detection of the defect includes generating the output indicating detection of the defect based on the reconstruction error value exceeding the threshold.

Example 16 includes the method of Example 14, wherein generating the output indicating detection of the defect includes generating the output indicating detection of the defect based on the reconstruction error value being below the threshold.

Example 17 includes the method of any one of Examples 14-16, further comprising training the autoencoder using the combination of the model data and the training data.

Example 18 includes the method of Example 17, wherein training the autoencoder includes processing the model data to generate a first plurality of neural network nodes corresponding to a plurality of model-based features derived from the model data, processing the training data to generate a second plurality of neural network nodes corresponding to a plurality of machine learning-based features derived from the training data, and creating a plurality of interconnections between the first and second pluralities of neural network nodes based on correlations between the model-based features and the machine learning-based features.

Example 19 includes the method of Example 18, wherein training the autoencoder further comprises forming a plurality of layers in a latent space representation of the autoencoder, the first and second pluralities of neural network nodes being distributed among the plurality of layers.

Example 20 includes the method of any one of Examples 17-19, wherein training the autoencoder comprises annotating at least a portion of at least one of the model data or the training data.

Example 21 includes the method of any one of Examples 14-20, wherein the autoencoder comprises a code constructed based on correlations determined between model-based features derived from the model data and machine learning-based features derived from the training data, and wherein processing the image comprises encoding the image using the autoencoder to produce an encoded image, and applying the code to the encoded image to generate the reconstructed image.

Example 22 includes the method of any one of Examples 14-21, further comprising acquiring the image using an imaging device.

Example 23 includes the method of any one of Examples 14-22, further comprising storing the model data and the training data.

Example 24 provides a PCB inspection system configured to implement the method of any one of Examples 14-23.

Having described above several aspects of at least one embodiment, it is to be appreciated various alterations, modifications, and improvements will readily occur to those skilled in the art. Such alterations, modifications, and improvements are intended to be part of this. Accordingly, the foregoing description and drawings of various embodiments are presented by way of example only. These examples are not intended to be exhaustive or to limit embodiments to the precise forms disclosed. The methods and apparatuses are capable of implementation in other embodiments and of being practiced or of being carried out in various ways. In addition, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

What is claimed is:

1. A printed circuit board (PCB) inspection system comprising:

an imaging device configured to capture an image of a PCB under inspection, the PCB under inspection including at least one feature of interest;

a data bus coupled to the imaging device and configured to transfer the image; and a processing device coupled to the data bus, the processing device comprising an inspection module including an autoencoder trained to recognize the at least one feature of interest based on a combination of model data and training data, wherein images corresponding to the model data are compressed or encoded, using an encoder of the autoencoder, into a latent-space representation, and images corresponding to the training data are compressed and encoded into the latent-space representation using the encoder, and wherein, in the latent-space representation, shared representations of encoded model-based features and machine learning features are analyzed to identify the correlations between the features from each processing chain, the autoencoder configured to receive and process the image to produce a reconstructed image, and a defect detection module configured to compare the reconstructed image to the image to generate a reconstruction error value, and to produce an output indicating detection of a defect in the feature of interest based on the reconstruction error value transgressing a threshold value;

wherein the model data comprises pictorial representations of PCB components and layouts, including drawings, sketches, models, and/or other characterizations or representations, including a computer-assisted drawing (CAD) images, rather than photographic images of PCBs or their components.

2. The PCB inspection system of claim 1, wherein the autoencoder includes:

a model-based process configured to operate on the model data to generate a first plurality of neural network nodes corresponding to a plurality of model-based features derived from the model data; and a machine learning process configured to operate on the training data to generate a second plurality of neural network nodes corresponding to a plurality of machine learning-based features derived from the training data.

3. The PCB inspection system of claim 2, wherein the autoencoder includes a neural network corresponding to interconnections between the first and second pluralities of neural network nodes, the neural network defining a code;

wherein the autoencoder is configured to encode the image to produce an encoded image, and to apply the code to the encoded image to produce the reconstructed image.

4. The PCB inspection system of claim 2, wherein the autoencoder includes a plurality of network layers, the first and second pluralities of neural network nodes being distributed among the plurality of layers.

5. The PCB inspection system of claim 1, wherein the defect detection module is configured to produce the output indicating the detection of the defect based on the reconstruction error value exceeding the threshold value.

6. The PCB inspection system of claim 1, wherein the at least one feature of interest includes a wire bond.

7. The PCB inspection system of claim 1, further comprising:

at least one processor-readable storage medium coupled to the data bus and configured to store one or more of the training data, the model data, or the image.

8. A computer program product including one or more non-transitory machine-readable mediums having instructions encoded thereon that when executed by at least one processor cause a process to be carried out for detecting defects in one or more features of interest on a printed circuit board (PCB), the process comprising:

processing an image of the PCB using an autoencoder to generate a reconstructed image, the autoencoder having been trained to recognize the at least one feature of interest based on a combination of model data and training data, wherein images corresponding to the model data are compressed or encoded, using an encoder of the autoencoder, into a latent-space representation, and images corresponding to the training data are compressed and encoded into the latent-space representation using the encoder, and wherein, in the latent-space representation, shared representations of encoded model-based features and machine learning features are analyzed to identify the correlations between the features from each processing chain, wherein the model data comprises various pictorial representations of PCB components and layouts, including drawings, sketches, models, and/or other characterizations or representations, including a computer-assisted drawing (CAD) image, rather than photographic images of PCBs or their components;

comparing the reconstructed image to the image;

based on the comparison, generating a reconstruction error value representing a measure of difference between the image and the reconstructed image; and generating an output indicating detection of a defect in at least one of the one or more features of interest based on the reconstruction error value transgressing a threshold.

9. The computer program product of claim 8, wherein the process further comprises:

prior to processing the image, training the autoencoder using the combination of the model data and the training data.

10. The computer program product of claim 9, wherein training the autoencoder comprises:

processing the model data to generate a first plurality of neural network nodes corresponding to a plurality of model-based features derived from the model data;

processing the training data to generate a second plurality of neural network nodes corresponding to a plurality of machine learning-based features derived from the training data; and creating a plurality of interconnections between the first and second pluralities of neural network nodes based on correlations between the model-based features and the machine learning-based features.

11. The computer program product of claim 10, wherein training the autoencoder further comprises:

forming a plurality of layers in a latent space representation of the autoencoder, the first and second pluralities of neural network nodes being distributed among the plurality of layers.

12. The computer program product of claim 9, wherein training the autoencoder further comprises annotating at least a portion of at least one of the model data or the training data.

13. The computer program product of claim 8, wherein the autoencoder comprises a code constructed based on correlations determined between model-based features derived from the model data and machine learning-based features derived from the training data, and wherein processing the image comprises:

encoding the image using the autoencoder to produce an encoded image; and applying the code to the encoded image to generate the reconstructed image.

14. A method of detecting defects in one or more features of interest on a printed circuit board (PCB), the method comprising:

processing an image of the PCB using an autoencoder to generate a reconstructed image, the autoencoder having been trained to recognize the at least one feature of interest based on a combination of model data and training data, wherein images corresponding to the model data are compressed or encoded, using an encoder of the autoencoder, into a latent-space representation, and images corresponding to the training data are compressed and encoded into the latent-space representation using the encoder, and wherein, in the latent-space representation, shared representations of encoded model-based features and machine learning features are learned to discover the correlations between the features from each processing chain, wherein the model data comprises various pictorial representations of PCB components and layouts, including drawings, sketches, models, and/or other characterizations or representations, including a computer-assisted drawing (CAD) image, rather than photographic images of PCBs or their components;

comparing the reconstructed image to the image;

based on the comparison, generating a reconstruction error value representing a measure of difference between the image and the reconstructed image; and generating an output indicating detection of a defect in at least one of the one or more features of interest based on the reconstruction error value transgressing a threshold.

15. The method of claim 14, wherein generating the output indicating detection of the defect includes generating the output indicating detection of the defect based on the reconstruction error value exceeding the threshold.

16. The method of claim 14, further comprising:

training the autoencoder using the combination of the model data and the training data.

17. The method of claim 16, wherein training the autoencoder includes:

processing the model data to generate a first plurality of neural network nodes corresponding to a plurality of model-based features derived from the model data;

processing the training data to generate a second plurality of neural network nodes corresponding to a plurality of machine learning-based features derived from the training data; and creating a plurality of interconnections between the first and second pluralities of neural network nodes based on correlations between the model-based features and the machine learning-based features.

18. The method of claim 17, wherein training the autoencoder further comprises:

forming a plurality of layers in a latent space representation of the autoencoder, the first and second pluralities of neural network nodes being distributed among the plurality of layers.

19. The method of claim 14, wherein the autoencoder comprises a code constructed based on correlations determined between model-based features derived from the model data and machine learning-based features derived from the training data, and wherein processing the image comprises:

encoding the image using the autoencoder to produce an encoded image; and applying the code to the encoded image to generate the reconstructed image.

20. The method of claim 14, further comprising:

acquiring the image using an imaging device.

* * * * *